(12) United States Patent
Mehta (10) Patent No.: US 11,941,250 B2
(45) Date of Patent: Mar. 26, 2024

(54) OPTIMIZING APPLICATION EXECUTION BASED ON MEMORY-LEVEL PARALLELISM (MLP)-BASED METRICS

(71) Applicant: HEWLETT PACKARD ENTERPRISE DEVELOPMENT LP, Houston, TX (US)

(72) Inventor: Sanyam Mehta, Bloomington, MN (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 139 days.

(21) Appl. No.: 17/662,356

(22) Filed: May 6, 2022

(65) Prior Publication Data

US 2023/0359358 A1 Nov. 9, 2023

(51) Int. Cl.
*G06F 3/06* (2006.01)
*G06F 12/0811* (2016.01)

(52) U.S. Cl.
CPC .......... *G06F 3/0611* (2013.01); *G06F 3/0629* (2013.01); *G06F 3/0673* (2013.01); *G06F 12/0811* (2013.01); *G06F 2212/604* (2013.01)

(58) Field of Classification Search
None
See application file for complete search history.

(56) References Cited

U.S. PATENT DOCUMENTS

| 5,809,450 | A | 9/1998 | Chrysos et al. |
| 5,923,872 | A | 7/1999 | Chrysos et al. |
| 5,964,867 | A | 10/1999 | Anderson |
| 6,070,009 | A | 5/2000 | Dean et al. |
| 6,119,075 | A | 9/2000 | Dean et al. |
| 6,148,396 | A | 11/2000 | Chrysos et al. |
| 6,163,840 | A | 12/2000 | Chrysos et al. |
| 6,195,748 | B1 | 2/2001 | Chrysos et al. |
| 6,237,073 | B1 | 5/2001 | Dean |
| 6,549,930 | B1 | 4/2003 | Chrysos et al. |
| 2009/0248976 | A1* | 10/2009 | Rotithor ............... G06F 9/5016 711/E12.017 |
| 2015/0121048 | A1* | 4/2015 | Lukefahr ............... G06F 1/32 712/229 |

(Continued)

OTHER PUBLICATIONS

Dublish et al. (Evaluating and Mitigating Bandwidth Bottlenecks Across the Memory Hierarchy in GPUs), pp. 239-248 ISBN# 978-1-5386-3890 IEEE (Year: 2017).*

(Continued)

*Primary Examiner* — Kaushikkumar M Patel
(74) *Attorney, Agent, or Firm* — Trop, Pruner & Hu, P.C.

(57) ABSTRACT

A process includes determining a memory bandwidth of a processor subsystem corresponding to an execution of an application by the processor subsystem. The process includes determining an average memory latency corresponding to the execution of the application and determining an average occupancy of a miss status handling register queue associated with the execution of the application based on the memory bandwidth and the average memory latency. The process includes, based on the average occupancy of the miss status handling register queue and a capacity of the miss status handling register queue, generating data that represents a recommendation of an optimization to be applied to the application.

20 Claims, 6 Drawing Sheets

(56) References Cited

U.S. PATENT DOCUMENTS

2020/0159586 A1\*  5/2020  Chandramoorthy .. G06F 9/4806
2020/0293445 A1\*  9/2020  Ibrahim .............. G06F 12/0811
2023/0061576 A1\*  3/2023  Mehta ................. G06F 9/30047

OTHER PUBLICATIONS

Chaudhuri et al. (Latency, Occupancy, and Bandwidth in DSM Multiprocessors: A Performance Evaluation) IEEE Transactions on Computers; pp. 862-879; Jul. 2003 (Year: 2003).\*
Eyerman, Stijn; "Many-Core Graph Workload Analysis"; IEEE, SC18, Dallas, Texas; Nov. 11-16, 2018; 11 pp.

\* cited by examiner

OPTIMIZING APPLICATION EXECUTION BASED ON MEMORY-LEVEL PARALLELISM (MLP)-BASED METRICS

BACKGROUND

A hardware processor (e.g., a central processing unit (CPU) package, or "socket") when executing a particular application, may experience one or multiple performance bottlenecks. Due to the ever-increasingly complex architecture of modern hardware processors, which have such features as multiple instruction issue and out-of-order execution, there may be many potential causes of performance bottlenecks. As examples, performance bottlenecks may include instruction issue stalls due to a fully filled scheduler or reorder buffer (ROB); instruction issue stalls due to a long latency load; fetch-related front end pipeline stalls; issue-related backend pipeline stalls; memory access problems; and so forth.

DETAILED DESCRIPTION

With so many potential causes of performance bottlenecks in hardware processors, identifying the cause of a particular performance bottleneck may be a formidable task. In this context, a "hardware processor" refers to an actual, physical component that includes one or multiple processing cores (e.g., CPU cores) that execute machine-readable instructions (i.e., "software"). In accordance with example implementations, the hardware processor may be a multi-core CPU semiconductor package (or "socket"). A "performance bottleneck" generally refers to a condition (e.g., an average queue occupancy at or near full capacity) that is associated with a component (e.g., a queue) of a hardware processor, which places a limit, or restriction, on the processor's ability to perform at a higher level. An application that executes on a hardware processor may be changed, or optimized, for purposes of addressing a particular performance bottleneck for purposes of enhancing the performance of the processor.

For purposes of determining the cause(s) of a performance bottleneck, a user (e.g., a software developer) may use one or multiple performance evaluation tools for purposes of visualizing the architecture of the hardware processor and more specifically, visualizing how components of the hardware processor perform when executing a particular application. If the performance evaluation tool(s) happen to expose the right set of performance counters of the hardware processor, then the cause(s) of the performance bottleneck may be revealed to the user. A "performance counter" generally refers to a hardware counter that is built into a hardware processor and counts occurrences of a specific hardware event (e.g., cache misses, cycles per instruction, stalls, and so forth) of the hardware processor. A performance tool may, however, fall short of revealing the cause(s) of a performance bottleneck to the user due to a disconnect between the performance tool and the processor architecture and/or a disconnect between the performance tool and the user.

The disconnect between a performance tool and the processor architecture may be attributable at least in part to the complexity of the modern processor architectures. Out-of-order execution in the modern hardware processor is achieved at the expense of a complex interplay between various processor structures, which complicate the interpretation of the processor's performance counters and may not provide a clear picture of the processor's performance when executing a particular application. These challenges may be further compounded by a specific hardware processor not exposing the appropriate performance counter(s) to the performance evaluation tool to allow tracing of the cause(s) of the performance bottleneck.

The disconnect between a performance tool and a user may be attributable at least in part to the level of expertise of the user. For a non-expert user who does not adequately understand the microarchitectural details of the hardware processor, the values reported by the processor's performance counters may not be meaningful. For the expert user who sufficiently understands the microarchitectural details of the processor, the performance counters may still be rather unhelpful due to the failure of the performance counters to direct the user to concrete, actionable steps (e.g., optimizations) to take to improve (or at least attempt to improve) performance of the hardware processor.

In accordance with example implementations that are described herein, a performance analyzer (which may also be referred to as "a memory-level parallelism (MLP) metric-based performance analyzer" or a "MLP metric-based performance analyzer") may be used to analyze the performance of a hardware processor when executing a particular subpart of an application. Here, the "subpart" of the application corresponds to a unit of machine-readable instructions, which correspond to a selected part of the application, such as a routine, a subroutine or a loop of the application. The MLP metric is a measure of the hardware processor's ability to perform multiple memory operations at the same time when executing the subpart of the application. In accordance with example implementations, the MLP metric represents the average occupancy of a miss status handling register (MSHR) queue of the hardware processor (e.g., the average number of registers of the MSHR queue, which are occupied) when the application subpart executes.

A hardware processor may include multiple MSHR queues, which are individually associated with respective caches (e.g., level one (L1) caches and level two (L2) caches) of the hardware processor. In general, the MSHR queue contains a set of registers, and a register, when occupied, represents an outstanding memory request due to a cache miss occurring with the cache that is associated with the MSHR queue. As an example, a register of an MSHR queue may correspond to an associated outstanding memory request and contain information about the request, such as an address of the requested block, whether the requested block corresponds to a read or write, and a cycle at which the requested block will be ready.

In accordance with example implementations, the MLP metric is generic in nature. In this manner, the MLP metric, in the abstract, is not associated with a specific MSHR queue of the hardware processor. The performance analyzer however, associates with the MLP metric with a particular MSHR queue based on the predominant type of memory access (e.g., streaming or random) that occurs when the hardware processor executes the application subpart. In accordance with example implementations, the performance analyzer associates the MLP metric with either an MSHR queue that corresponds to an L1 cache or an MSHR queue that corresponding to an L2 cache) based on the predominant type of memory access. For example, when the predominant type of memory access is a random access, the performance analyzer associates the MLP metric with the MSHR queue for the L1 cache (as this MSHR queue is more likely to be a performance bottleneck). When the predominant type of memory access is a streaming access, the performance analyzer associates the MLP metric with the MSHR queue for the L2 cache (as this MSHR queue is more likely to be a performance bottleneck). In accordance with example implementations, the performance analyzer compares the average MSHR queue occupancy (represented by the MLP metric) to the full capacity of the MSHR queue that the performance analyzer associates with the MLP metric. In accordance with example implementations, the performance analyzer, based on the comparison, generates data (e.g., data for a graphical user interface (GUI)) that represents one or multiple recommended optimizations that may be applied to the application to enhance the processor's processing performance.

Among its potential advantages, the performance analyzer may determine the MLP metric using a relatively small number of performance counter values. The performance counter values may correspond to performance counters that are widely available for processors that are provided by different vendors. The performance analyzer may also be beneficial for a user who has a limited knowledge of the microarchitectural details of the hardware processor, as the MLP metric abstracts away details of out-of-order execution from the user. This way, the MLP metric may be directly correlated to a particular MSHR queue that is associated with a particular cache, and accordingly, the user may contend with a single comprehensible structure of the hardware processor.

Figure 1:
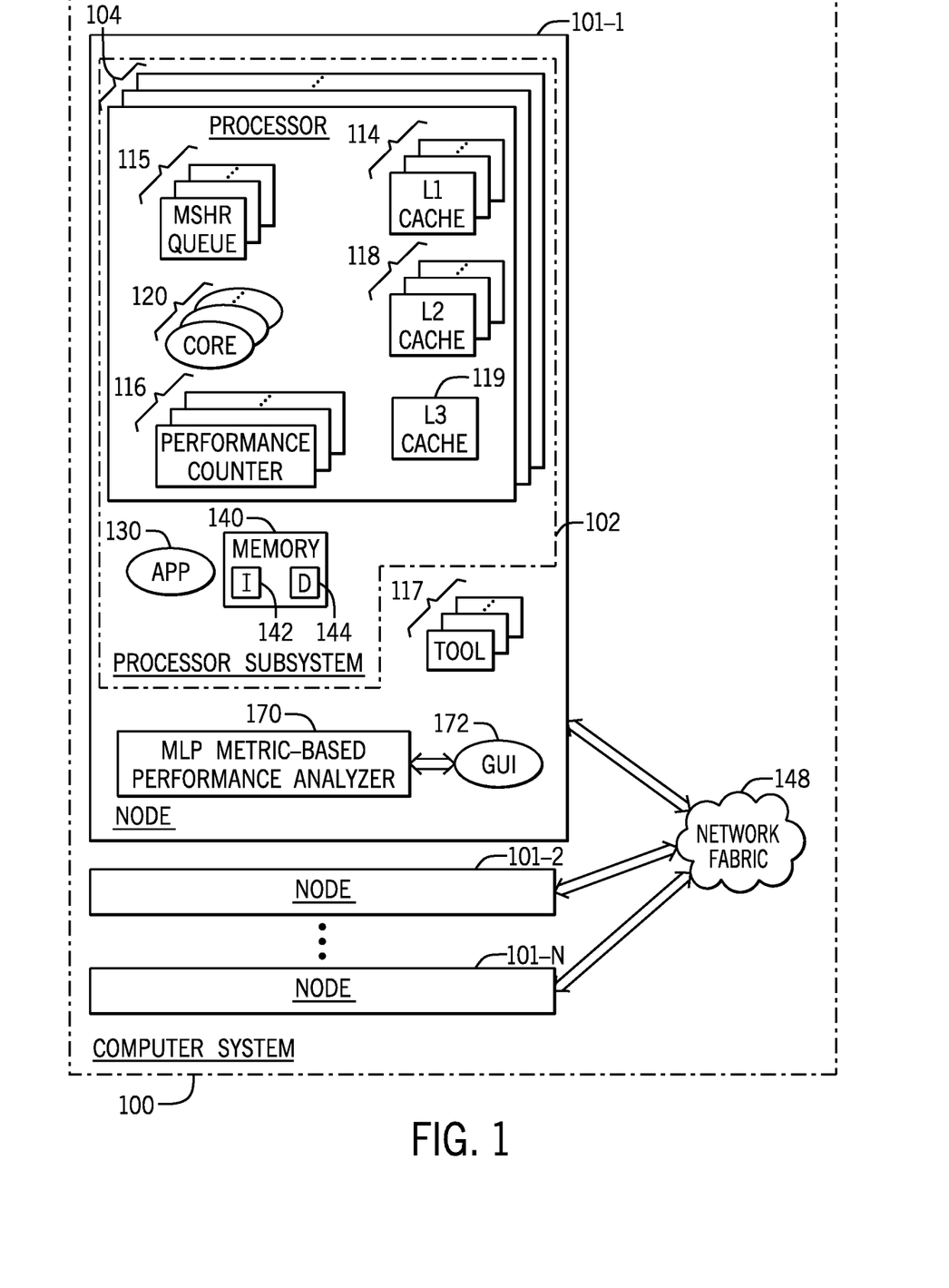
FIG. 1 is a block diagram of a computer system that includes a memory-level parallelism (MLP) metric-based performance analyzer according to an example implementation.

Referring to FIG. 1, as a more specific example, in accordance with some implementations, a computer system 100 includes one or multiple nodes 101 (N example nodes 101-1 to 101-N, being depicted in FIG. 1), which may be interconnected by network fabric 148. In accordance with some implementations, a given node 101 may correspond to a computer platform 100. In accordance with some implementations, the computer system 100 may be a cluster computer system, and the nodes 101 may include compute nodes of the cluster as well as possibly other nodes, such as administrative nodes, storage nodes, and so forth. In accordance with further implementations, the computer system 100 may not be a cluster computer system. FIG. 1 depicts details for a specific node 101-1, which is described herein, in accordance with an example implementation.

The node 101, in accordance with example implementations, may be a modular unit, which includes a frame, or chassis. Moreover, this modular unit may include hardware that is mounted to the chassis and is capable of executing machine-executable instructions. A blade server is an example of the node 101, in accordance with an example implementation. The node 101 may, however, be any of number of different platforms other than a blade server, in accordance with further implementations, such as a rack-mounted server, standalone server, a client, a desktop, a smartphone, a wearable computer, a networking component, a gateway, a network switch, a storage array, a portable electronic device, a portable computer, a tablet computer, a thin client, a laptop computer, a television, a modular switch, a consumer electronics device, an appliance, an edge processing system, a sensor system, a watch, a removable peripheral card, and so forth.

It is noted that the architecture of the node 101-1, which is depicted in FIG. 1 is one of many possible architectures for the node 101, in accordance with one of many possible implementations. Moreover, in accordance with further example implementations, the node 101-1 may be a stand-alone node (i.e., not part of a computer system 100 of multiple nodes 101, as depicted in FIG. 1). Other nodes 101 of the computer system 100 may or not have an architecture that is similar to the node 101-1. Thus, many implementations are contemplated, which are within the scope of the appended claims.

The network fabric 148 may be associated with one or multiple types of communication networks, such as (as examples) Fibre Channel networks, Gen-Z fabrics, dedicated management networks, local area networks (LANs), wide area networks (WANs), global networks (e.g., the Internet), wireless networks, or any combination thereof.

In accordance with example implementations, the node 101-1 may include one or multiple hardware processors 104. In this context, a "hardware processor" refers to an actual, physical device, or component, which has one or multiple processing cores 120 that execute machine-readable instructions (or "software"). As a specific example, in accordance with some implementations, the hardware processor 104 may be a multi-core CPU semiconductor package, or "socket," which contains multiple CPU processing cores 120.

The hardware processor 104 may include one or multiple level one (L1) caches 114. In accordance with example implementations, each processing core 120 may have its own dedicated L1 cache 114, and in accordance with further example implementations, multiple processing cores 120 (e.g., two or more processing cores 120) may share an L1 cache 114. Moreover, as also depicted in FIG. 1, in accordance with example implementations, the hardware processor 104 may include one or multiple level two (L2) caches 118. In accordance with some implementations, each processing core 120 may have its own dedicated L2 cache 118, and in accordance with further implementations, multiple processing cores 120 (e.g., two or more processing cores 120) may share an L2 cache. It is noted that the hardware processor 104 may contain higher level caches, such as one or multiple level three (L3) caches 119, in accordance with example implementations.

In accordance with some implementations, the L1 cache 114 may have a relatively small size (in terms of memory capacity) and may be formed from a memory that has an associated relatively fast response time. For example, in accordance with some implementations, the L1 cache 114 may be formed from static random access memory (SRAM) devices. In accordance with example implementations, the L2 cache 118 may be a relatively larger memory (as compared to the capacity of the L1 cache 114), which may, for example, be formed from dynamic random access memory (DRAM) devices. The L1 cache 114, the L2 cache 118 and other memories that are described herein, in general, are non-transitory storage media that may be formed from non-transitory memory devices, such as semiconductor storage devices, flash memory devices, memristors, phase change memory devices, a combination of devices formed from one or more of the foregoing storing technologies, and so forth. Moreover, the memory devices may be volatile memory devices (e.g., DRAM devices, SRAM devices, and so forth) or non-volatile memory devices (e.g., flash memory devices, read only memory (ROM) devices, and so forth), unless otherwise stated herein.

In accordance with example implementations, the hardware processor 104 includes a dedicated miss status handling register (MSHR) queue 115 for each of the L1 caches 114 and a dedicated MSHR queue 115 for each of the L2 caches 118 (i.e., in accordance with example implementations, each MSHR queue 115 has a respective, associated L1 cache 114 or L2 cache 118). Moreover, as depicted in FIG. 1, in accordance with example implementations, the hardware processor 104 may include one or multiple performance counters 116. The performance counters 116 count different events that occur in the hardware processor 104. As an example, a particular performance counter 116 may reveal a count of L3 misses, which may be used, as further described herein, for purposes of assessing a memory bandwidth utilization.

In accordance with example implementations, the node 101-1 includes an MLP metric-based performance analyzer 170 (herein referred to as the "performance analyzer 170") that, in general, may be used to analyze execution of an application 130 (or a selected subpart of the application 130) by a processor subsystem 102 of the node 101-1. In accordance with example implementations, the processor subsystem 102 includes the hardware processor(s) 104 and a system memory 140 of the node 101-1. In accordance with example implementations, the application 130 (or selected subpart of the application 130) may execute simultaneously on one or more processing cores 120 of a particular hardware processor 104 of the node 101-1. Moreover, in accordance with example implementations, the application 130 (or selected subpart of the application 130) may execute simultaneously on multiple hardware processors 104 of the node 101-1. The performance analyzer 170, in accordance with example implementations, may be used to target the execution of a particular subpart of the application 130. In this manner, the targeted subpart may be machine executable instructions (i.e., program code or "software"), which corresponds to a particular routine, subroutine or loop of the application 130, which has been designated by a user of the performance analyzer 170 for analysis by the performance analyzer 170.

The performance analyzer 170, as further described herein, calculates a MLP metric that represents a measure of the MLP of the processor subsystem 102 when executing a selected subpart of the application 130. In accordance with example implementations, the MLP also represents a calculated average MSHR queue occupancy. In accordance with example implementations, the performance analyzer 170, based on the predominant type of memory accesses (e.g., streaming or random) that occur during the execution of the subpart of the application 130, selects either an MSHR queue 115 that is associated with the L1 cache 114 or an MSHR queue 115 that is associated with the L2 cache 118. By way of this selection, the performance analyzer 170 designates the selected MSHR queue 115 as being a potential performance bottleneck, i.e., the performance analyzer 170 determines that the selected MSHR queue 115 is the most likely to impact the performance of the processor subsystem 102 in executing the subpart of the application 130. It is noted that the selection of the MSHR queue 115, in accordance with example implementations, is a selection of an MSHR queue type, e.g., a selection of an L1 cache-associated MSHR queue 115 or an L2 cache-associated MSHR queue 115. In accordance with example implementations, all L1 cache-associated MSHR queues 115 have the same size, or capacity (i.e., the same number of registers), and all L2-cache associated MSHR queues 115 have the same capacity (i.e., the same number of registers).

The performance analyzer 170, in accordance with example implementations, compares the average MSHR queue occupancy (which is represented by the MLP metric) to the size, or capacity (e.g., the number of registers), of the selected MSHR queue 115. In accordance with example implementations, based on this comparison, the performance analyzer 170 selects one or multiple optimizations for the application 130. In general, an "optimization" for the application is a change to be applied to the application 130 for purposes of improving the processor's execution performance for the application subpart being analyzed.

The performance analyzer 170, in accordance with example implementations, provides data to a graphical user interface (GUI) 172, which causes the GUI 172 to display the recommended optimization(s). The performance analyzer 170 may further provide data to the GUI 172, which causes the GUI 172 to display analytics, which characterize the execution of the subpart of the application 130. These analytics may include one or multiple values of performance counters 116, the MLP metric value, an identification of the cache type associated with the selected MSHR queue 115, the capacity of the selected MSHR queue 115, one or multiple performance metrics derived from value(s) of the performance counters 116, and so forth. The GUI 172 may, in accordance with example implementations, receive user input. For example, in accordance with some implementations, a user may, via one or multiple input/output devices (e.g., a keyboard, a touchscreen, a mouse, a trackpad and so forth), provide input to the GUI 172, which represents a selection of a subpart of the application 130 for analysis; input representing parameters to control the analysis by the performance analyzer 170; input representing control buttons and options of the GUI 172; input used by the performance analyzer to determine the MLP metric (e.g., such input as a memory bandwidth, a cache line size, an average latency, a type of predominant memory access associated with the application subpart, a bandwidth versus latency plot for a hardware processor 104, performance count values, and so forth); and so forth.

In accordance with example implementations, the performance analyzer 170 is a software entity that is hosted on the node 101-1 and is provided by one or multiple processing cores 120 of one or multiple hardware processors 104 of the node 101-1 executing machine-readable instructions while one or multiple processing cores 120 of one or multiple hardware processors 104 of the node 101-1 execute the application subpart being analyzed. In accordance with example implementations, machine-readable instructions 142 corresponding to the performance analyzer 170 may be stored in the system memory 140. Moreover, machine-readable instructions corresponding to the application 130 may be stored in the system memory 140. As also depicted in FIG. 1, in accordance with some implementations, the memory 140 may further store data 144. The data 144 may include data that is associated with the performance analyzer 170 and/or GUI 172, such as input for the performance analyzer 170, input for the GUI 172, control parameters for the performance analyzer 170, an output for the performance analyzer 170, an output for the GUI 172, intermediate values derived by the performance analyzer 170 as part of its analysis and recommendation process, and so forth. The system memory 140 may further store data related to the application 130. Although FIG. 1 depicts the performance analyzer 170 as being on the same node 101-1 as the application 130 being evaluated, in accordance with further implementations, the performance analyzer 170 may be located on another node 101 other than the node 101 on which the application 130 executes. In a similar manner, in accordance with further implementations, the GUI 172 may not be located on the same node 101 as the application 130. Moreover, in accordance with further implementations, the GUI 172 and the performance analyzer 170 may be located on different nodes 101.

In accordance with further implementations, all or part of the performance analyzer 170 may be formed by dedicated hardware that does not execute machine-readable instructions. For example, in accordance with further implementations, all or part of the performance analyzer 170 may be formed by an application specific integrated circuit (ASIC), a complex logic device (CLD), a field programmable gate array (FPGA), and so forth.

As also depicted in FIG. 1, in accordance with some implementations, the node 101 may contain one or multiple performance evaluation tools 117. As an example, in accordance with some implementations, a particular performance evaluation tool 117 may provide a latency versus bandwidth utilization plot. As another example, in accordance with some implementations, a particular performance evaluation tool 117 may provide an average memory latency based on a bandwidth utilization provided as an input to the performance evaluation tool 117. In accordance with some implementations, as another example, a particular performance evaluation tool 117 may expose a particular performance counter 116 for purposes of determining a bandwidth utilization. Other performance evaluation tools 117 may be used in conjunction with the performance analyzer 170, in accordance with further implementations. In accordance with some implementations, the performance analyzer 170 may interface directly with one or multiple performance evaluation tools 117. Moreover, in accordance with some implementations, the GUI 172 may interface directly with one or multiple performance evaluation tools 117.

In accordance with example implementations, out-of-order execution by the hardware processor 104 relies on executing multiple operations and memory requests in parallel. At any time, the hardware processor 104 tracks all unique memory requests that have missed an L1 cache 114 or an L2 cache 118 (at cache line granularity) using the MSHR queue 115 that is associated with the cache 114, 118. This tracking thus avoids duplicate memory requests. The hardware processor 104, in accordance with example implementations, includes one or multiple hardware prefetchers (not shown). As an example, the hardware processor 104 may include hardware prefetchers for the L1 cache 114 and the L2 cache 118, which, when triggered, issue prefetch requests at their respective caches 114 and 118.

Depending on the predominant type of memory access that is associated with the execution of the application subpart, either the MSHR queues 115 corresponding to the L1 cache 114 or the MSHR queues 115 corresponding to the L2 cache 118 may give rise to performance bottlenecks. Whether or not a MSHR queue 115 causes a performance bottleneck may depend on two factors: 1. the size of the MSHR queue 115; and 2. the nature of the application subpart. In accordance with example implementations, the size of the MSHR queue 115 that is associated with the L1 cache 114 is kept relatively small (as compared to, for example, the size of the MSHR queue 115 that corresponds to the L2 cache 118) for purposes of meeting L1 cache access timing constraints. In this manner, the L1 cache access timing constraints may specify that all entries in the MSHR queue 115 are simultaneously searched for each memory request. The size of the MSHR queue 115 that corresponds to the L2 cache 118, in accordance with example implementations, may be considerably larger than the size of the MSHR queue 115 that corresponds to the L1 cache 114.

In accordance with example implementations, the performance analyzer 170 uses the predominant type of memory access that is associated with a particular application subpart's execution to be an indicator of which type of MSHR queue 115 (e.g., an L1 cache-associated MSHR queue 115 or an L2 cache-associated MSHR queue 115) may be the potential cause of a performance bottleneck. In this context, the "type" of memory accesses refers to whether the memory access are streaming accesses or random accesses. "Streaming memory accesses" refer to memory accesses that directed to predictable addresses (e.g., virtual addresses) of memory (e.g., accesses that coincide with the same cache line or set of cache lines, accesses that are directed to the same memory page or same sets of memory pages), such that the hardware processor 104 may predict future memory accesses based on a particular pattern of prior memory accesses. "Random memory accesses" refer to memory accesses that do not adhere to a particular pattern, and as such, the hardware processor 104 may not accurately predict future memory accesses from prior memory accesses. A "predominant" type of memory accesses refers to the type of memory accesses that are more prevalent, or greater in number, than another type of memory accesses. Therefore, if the execution of a given application subpart results in more random accesses to memory than streaming accesses to memory, then the execution of the application subpart is predominantly associated with random accesses. Conversely, if the execution of the given application subpart results in more streaming accesses to memory than random accesses to memory, then the execution of the application subpart is predominantly associated with streaming accesses.

If the execution of the application subpart does not trigger the hardware prefetcher for the L2 cache (such as in case of random memory accesses), then the average occupancy of the MSHR queue 115 that corresponds to the L2 cache 114 may not be more than the average occupancy of the MSHR queue 115 that corresponds to the L1 cache 118. Therefore, in accordance with example implementations, the performance analyzer 170 concludes that for an application subpart that is associated with predominantly random memory accesses, the MSHR queue 115 that corresponds to the L1 cache 114 is the potential cause of a limited MLP. Moreover, in accordance with example implementations, the performance analyzer 170 concludes that for an application subpart that is associated with predominantly streaming memory accesses that benefit from the L2 cache hardware prefetcher, the MSHR queue 115 that is associated with the L2 cache is the potential cause of a limited MLP.

In accordance with example implementations, the performance analyzer 170 may determine the average MSHR queue occupancy (called "$n_{avg}$" herein), or the MLP metric, based on Little's Law. Little's Law states that the average number of customers in a stationary system is equal to the long-term average effective arrival rate multiplied by the average time that a customer spends in the system. As Little's Law assumes a stationary system, in accordance with example implementations, the $n_{avg}$ average MSHR queue occupancy is determined for the application subpart (e.g., an individual routine, subroutine, loop and so forth of the application 130). Applying Little's Law, the $n_{avg}$ average MSHR queue occupancy for a given application subpart (e.g., a routine, subroutine or loop of an application 130) may be described as being the long-term average memory request arrival rate (i.e., the rate at which requests enter the MSHR queue 115) multiplied by the average memory latency (i.e., the average time that a request remains in the MSHR queue 115). The long-term average memory request arrival rate is the total number of memory requests (called "R" herein) during execution of the application subpart divided by a total time (called "T" herein) that the application subpart executes. Accordingly, the $n_{avg}$ average occupancy, or MLP, may be described as follows:

$$navg = \frac{lat_{avg} \times R}{T}, \qquad \text{Eq. 1}$$

where "$lat_{avg}$" represents the average memory latency. A memory bandwidth utilization, or observed memory bandwidth (called "BW" herein), during the execution of the application subpart, may be described as follows:

$$BW = \frac{R \times cls}{T}, \qquad \text{Eq. 2}$$

where "cls" represents the cache line size. Using Eq. 2, Eq. 1 may be rewritten as follows:

$$navg = \frac{lat_{avg} \times BW}{cls} \qquad \text{Eq. 3}$$

It is noted that the $lat_{avg}$ average memory latency refers to the observed memory latency in the hardware processor 104 at a particular BW memory bandwidth (and not, for example, an idle latency). In general, the observed latency increases as bandwidth utilization increases and may be two times or more than the idle latency at peak bandwidth utilization. In accordance with example implementations, the performance analyzer 170 may obtain the BW memory bandwidth either indirectly (e.g., via L3 cache miss counts provided by performance counters 116 of x86-based processing cores 120) or directly (e.g., via counts of memory reads/writes provided by performance counters 116 of ARM-based processing cores 120). The performance analyzer 170 may use the determined BW memory bandwidth to determine the $lat_{avg}$ average memory latency using, for example, a bandwidth-latency plot for the hardware processor 104. The bandwidth-latency plot for a hardware processor 104 may be calculated once using, for example, a performance evaluation tool 117.

Figure 2:
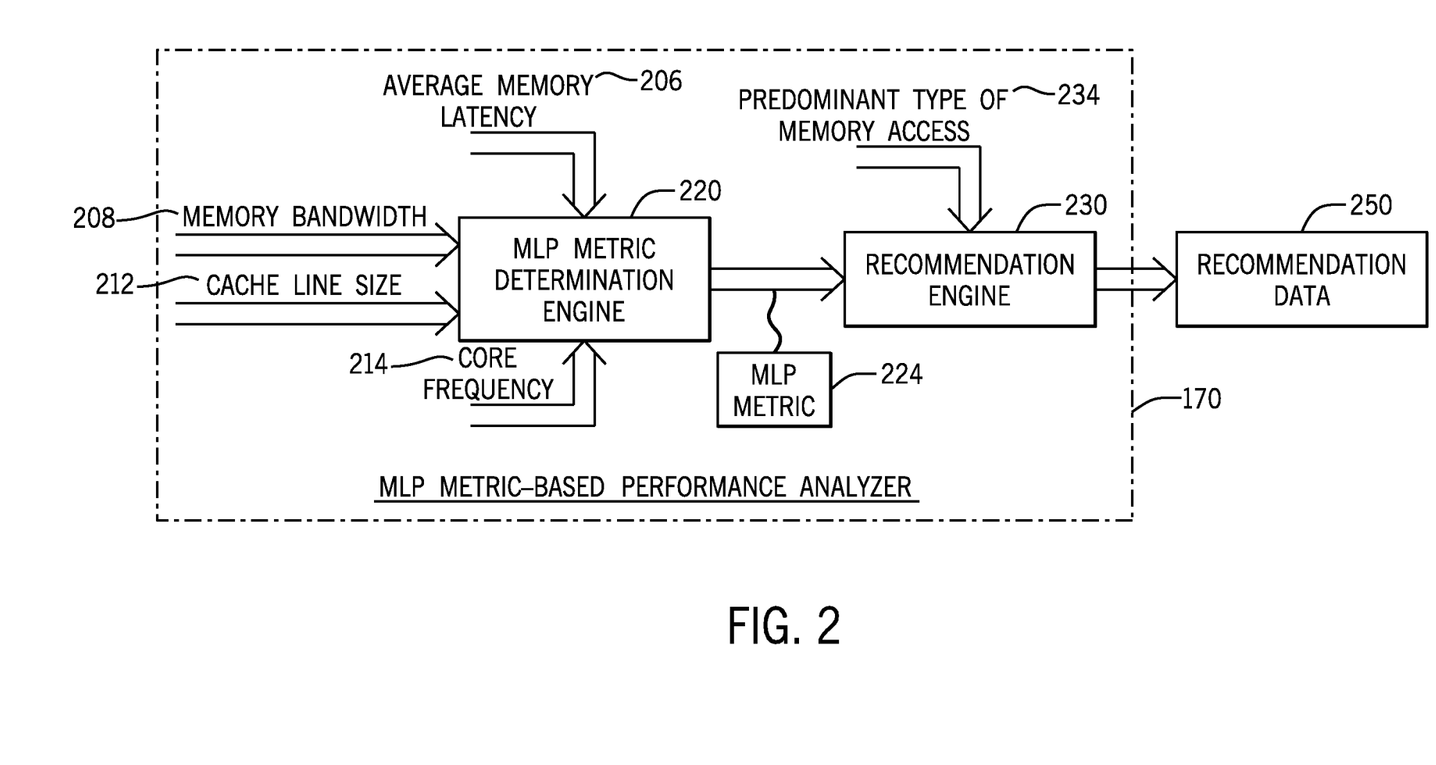
FIG. 2 is a block diagram of the performance analyzer of FIG. 1 according to an example implementation.

FIG. 2 depicts a block diagram of the performance analyzer 170, in accordance with example implementations. Referring to FIG. 2 in conjunction with FIG. 1, in accordance with example implementations, the performance analyzer 170 includes an MLP metric determination engine 220 and a recommendation engine 230. As depicted in FIG. 2, in accordance with example implementations, the MLP metric determination engine 220 may receive, as inputs, data representing an average memory latency 206, a memory bandwidth 208, a cache line size 212 and a core frequency 214. From these inputs, the MLP metric determination engine 220 may then generate data representing an MLP metric 224.

A recommendation engine 230 of the performance analyzer 170 may provide recommendation data 250 that represents a recommendation of one or multiple optimizations for the application 130 specifically selected by the recommendation engine 230 based on data 234 identifying the predominant type of memory access and the MLP metric 224. The recommendation data 250, in accordance with example implementations, may be data constructed to cause the GUI 172 to display the recommended optimization(s).

Any of a number of candidate optimizations may be considered by the recommendation engine 230 in accordance with example implementations. For example, one candidate optimization is vectorization, in which a single operation is applied on multiple operands. Vectorization offers another level of parallelism in addition to thread-level parallelism, and may therefore be quite effective in increasing MLP. Vectorization may particularly be helpful in increasing MLP on processors with high bandwidth memory (HBM). Also, the degree of parallelism (vector width) and coverage (with gather/scatter, predication, etc.) through vectorization is increasing in more modern processors, making it more widely applicable than before. Because vectorization improves MLP, vectorization also increases the average MSHR queue occupancy. Thus, if an application's average MSHR queue 115 occupancy is close to the MSHR queue 115 capacity, the application 130 may not benefit from vectorization. Otherwise, in accordance with example implementations, the recommendation engine 230 may recommend vectorization optimization.

Software prefetching is another example of a candidate optimization. In this optimization, the user or the compiler inserts software prefetch instructions in the source code for purposes of prefetching data to a specific level of cache. The prefetching may be especially useful for certain irregular access patterns because hardware prefetchers may either miss recognizing these patterns, or the hardware prefetchers may not recognize these patterns in a timely fashion. Each software prefetch request occupies an MSHR queue 115, which denies another demand load request or denies the hardware prefetcher from acquiring an MSHR queue 115. Accordingly, a unit of program code of an application may not benefit from the software prefetching optimization when the average MSHR queue 115 occupancy for that unit of program code is relatively high. The recommendation engine 230 may recommend software prefetch optimization for a unit of program code when the unit of program code is associated with predominantly random accesses to memory. For random accesses, the software prefetch optimization may lead to the use of L2 cache-associated MSHR queues 115, which are otherwise unused when the hardware prefetcher for the L2 cache is ineffective.

Loop tiling is another example of a candidate optimization. Loop tiling partitions an application loop's iteration space into smaller chunks or blocks so that data accessed in those smaller blocks stays in the cache until reused. Loop tiling may target cache reuse in different levels of the memory hierarchy. The recommendation engine 230, in accordance with example implementations, may recommend loop tiling responsive to the subpart of the application 130 experiencing a relatively high average MSHR queue 115 occupancy, because loop tiling reduces the number of memory requests and therefore, reduces the MSHR queue 115 occupancy.

Register tiling (or "unroll and jam" optimization) is another example of a candidate optimization. Registering tiling is similar to loop tiling except that register tiling targets data reuse in registers (instead of targeting cache reuse). Registering tiling may be particularly beneficial when memory accesses already experience a small latency due to a few number of memory accesses (i.e., most data fits in the higher levels of cache). A low MSHR queue 115 occupancy may be used to infer the small latency and accordingly, may be used as an indicator to the recommendation engine 230 for register tiling to be recommended.

Another candidate optimization is loop fusion optimization. Loop fusion fuses bodies of different loops or loop-nests, and as a result, loop fusion may significantly reduce the reuse distance of certain memory accesses. Like loop tiling, loop fusion is particularly useful in reducing the MSHR queue 115 occupancy as it promotes data reuse. Therefore, in accordance with example implementations, the recommendation engine 230 may recommend loop fusion optimization for relatively high MSHR queue occupancy.

Another candidate optimization is loop distribution optimization. Loop distribution is the exact opposite of loop fusion. It is a supporting optimization for loop fusion or vectorization like loop interchange. When used by itself, loop distribution it is expected to benefit performance when distributing loops can reduce the number of active streams or the memory bandwidth contention. Accordingly, in accordance with example implementations, the recommendation engine 230 may recommend loop distribution optimization for relatively higher MLP metric values and corresponding relatively higher average MSHR queue 115 occupancies.

In accordance with example implementations, the performance analyzer 170 may recommend simultaneous multithreading (SMT) or hyperthreading (HT). These are not optimizations but rather, different ways of executing the application 130, which involves using the simultaneous multithreading capability or hyperthreading capability of the hardware processor 104. SMT may be quite beneficial for hardware processors 104 that have HBM because SMT may significantly increase MLP. Threads on a processing core 120, which participate in SMT share most of core's resources including MSHR queues 115, and MSHR queue 115 occupancy is directly useful in understanding the benefit from SMT. A close to full MSHR queue 115 implies insufficient resources for more threads in a processing core 120. Therefore, in accordance with example implementations, the recommendation engine 230 recommends SMT for all applications 130, except applications 130 with high MSHR queue occupancy and except for special cases such as cache residency contention among threads.

Figure 3:
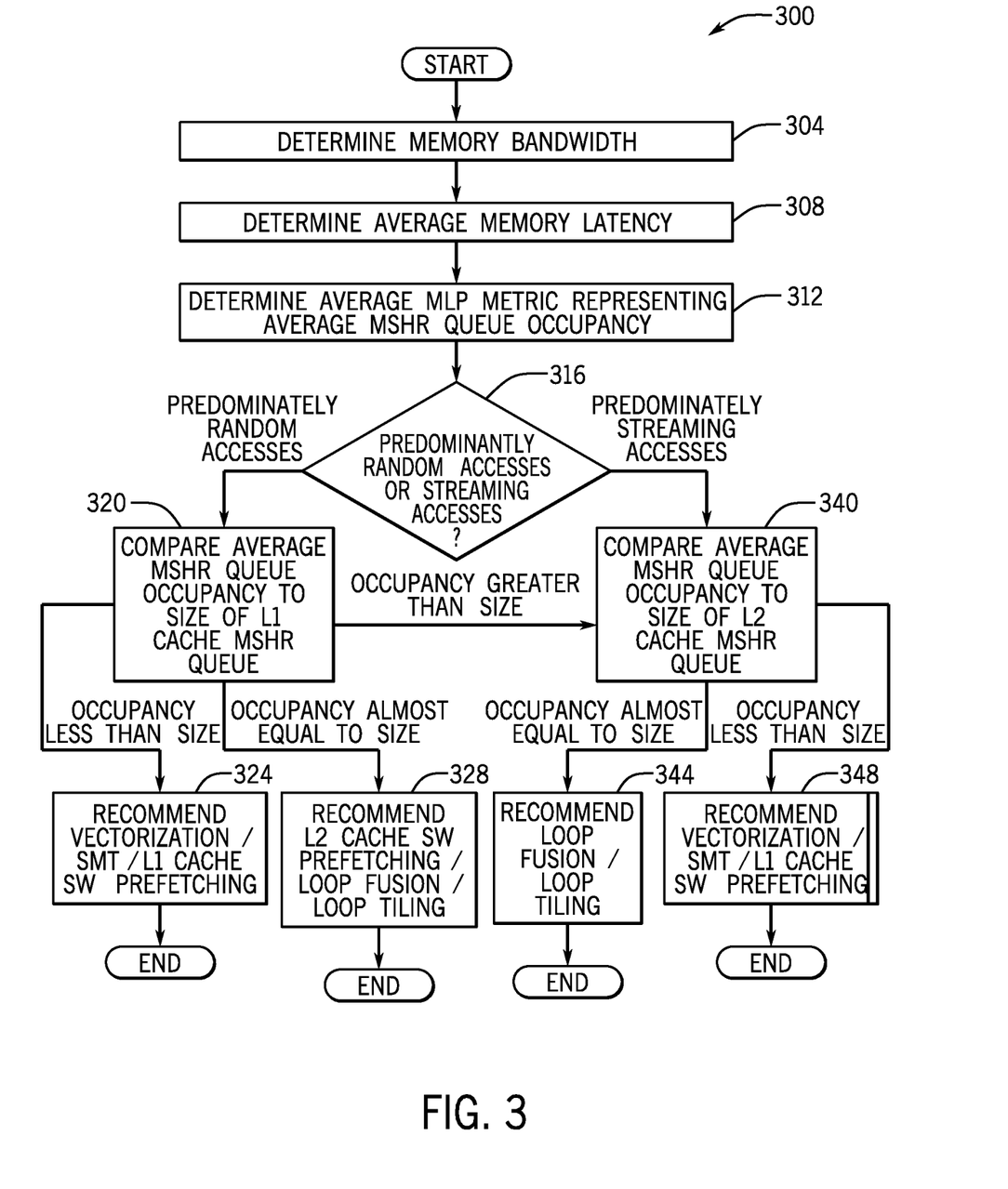
FIG. 3 is a flow diagram depicting a process performed by the performance analyzer of FIG. 1 to provide data recommending an optimization for an application according to an example implementation.

FIG. 3 depicts an example process 300 that may be performed by the performance analyzer 170, in accordance with example implementations. Referring to FIG. 3 in conjunction with FIGS. 1 and 2, in accordance with example implementations, blocks 304, 308 and 312 may be performed by the MLP metric determination engine 220, and blocks 316 to 348 may be performed by the recommendation engine 230.

Pursuant to block 304, the performance analyzer 170 determines the memory bandwidth. As an example, the performance analyzer 170 may make this determination based on the appropriate performance counter(s) 116, may derive the memory bandwidth via data that is provided via GUI 172, may derive the memory bandwidth using the output of a performance evaluation tool 117, and so forth. Next, in accordance with example implementations, the performance analyzer 170 determines (block 308) the average memory latency. In accordance with example implementations, the performance analyzer 170 may deduce the average memory latency from observed bandwidth based on observed loaded latency numbers for the processor 104. For this purpose, one or multiple performance evaluation tools 117 may be used, a bandwidth versus latency plot for the processor 104 may be used, input specifying the average memory latency may be provided by the user via the GUI 172, and so forth.

In accordance with example implementations, the process 300 next includes determining (block 312) the MLP metric using Eq. 3 above. The contention found with the MSHR queue 115 could be associated with either the L1 cache 114 or the L2 cache 118. Identifying the particular MSHR queue type (e.g., L1 cache-associated or L2 cache-associated), in accordance with example implementations, is a function of the application subpart in question. In this manner, if the execution of the application subpart is dominated by random memory accesses (e.g., the hardware prefetcher is largely ineffective), then the MSHR queue 115 that is associated with the L1 cache 114 is the source of the potential bottleneck. Otherwise, the MSHR queue 115 that is associated with the L2 cache 118 is the source of the bottleneck.

The determination of the predominant type of memory access is made in decision block 316 of the process 300 and involves transitioning to either block 320 for the case of predominantly random accesses or block 340 for the case of predominantly streaming accesses. In accordance with example implementations, the decision in decision block 316 may be made as a result of input (e.g., input provided via the GUI 172 by the user) to the performance analyzer 170. In accordance with further implementations, the performance analyzer 170 may perform decision block 316 by observing the fraction of memory requests that are generated from the hardware prefetcher versus demand loads. For example, this data may be exposed through one or multiple performance counters 116, or, alternatively, the type of memory access may be exposed by a user disabling the hardware prefetcher. In the event of a mixture of sequential and random memory accesses, such as in a sparse matrix-vector multiplication operation, the data structure generating random memory accesses usually easily dominates memory traffic, because each reference is usually to a different cache line as opposed to a different word on the same cache line.

With knowledge of the average MSHR queue 115 occupancy and the particular MSHR queue type that is the potential bottleneck, the performance analyzer 170 may then proceed to block 340 (for the case of predominantly streaming accesses) or block 320 (for the case of predominantly random accesses).

For predominantly random accesses, the performance analyzer 170 compares (block 320) the average MSHR queue 115 occupancy (represented by the MLP metric) to the size, or capacity of the MSHR queue 115 associated with the L1 cache. If the occupancy is less than the size, then, pursuant to block 324, the performance analyzer 170 may recommend vectorization, SMT, or L1 software prefetching. If the occupancy is almost equal to the size of the MSHR queue, then, pursuant to block 328, the performance analyzer 170 may recommend L2 cache software prefetching, loop fusion or loop tiling.

As an example, in accordance with some implementations, "almost the same as" or "almost equal to the size" may mean that the average MSHR queue occupancy is greater than or equal to a threshold that represents a certain percentage (e.g., 90 percent) of the MSHR queue's capacity. In accordance with further implementations, thresholds other than thresholds based on percentage of the capacity and/or techniques may be used to assess whether the average MSHR queue occupancy is "almost equal to" the MSHR queue 115 capacity. Regardless of how this is determined, in accordance with example implementations, if the average MSHR queue 115 occupancy is almost the same as the capacity, or size, of the MSHR queue 115, then the performance analyzer 170 recommends optimizations for reducing the average MSHR queue 115 occupancy and not increasing it. If the performance analyzer 170 determines that the MSHR queue 115 occupancy is less than the size of the MSHR queue 115 (e.g., the occupancy is less than 90 percent of the size of the MSHR queue 115), then, in accordance with example implementations, the performance analyzer 170 may consider all optimizations, including those that increase the MSHR queue occupancy or MLP may be applied.

If the performance analyzer 170 determines that the average occupancy of the MSHR queue is greater than the size of the MSHR queue, then the performance bottleneck may by the MSHR queue that is associate with the L2 cache. In this case, control transfers to block 340.

For predominately streaming accesses (pursuant to decision block 316), the performance analyzer 170 compares (block 340) the average MSHR queue 115 occupancy to the size of the L2 cache MSHR queue 115. If the occupancy is less than the size, then, pursuant to block 348, the performance analyzer 170 may recommend vectorization, SMT, or L1 cache software prefetching. If, the occupancy is almost equal to the size, then, pursuant to block 344, the performance analyzer 170 may recommend loop fusion or loop tiling.

It is noted that the process 300 may be repeated to consider other optimizations, depending upon changes in the average MSHR queue occupancy and observed performance due to the recommended optimization being applied.

Figure 4:
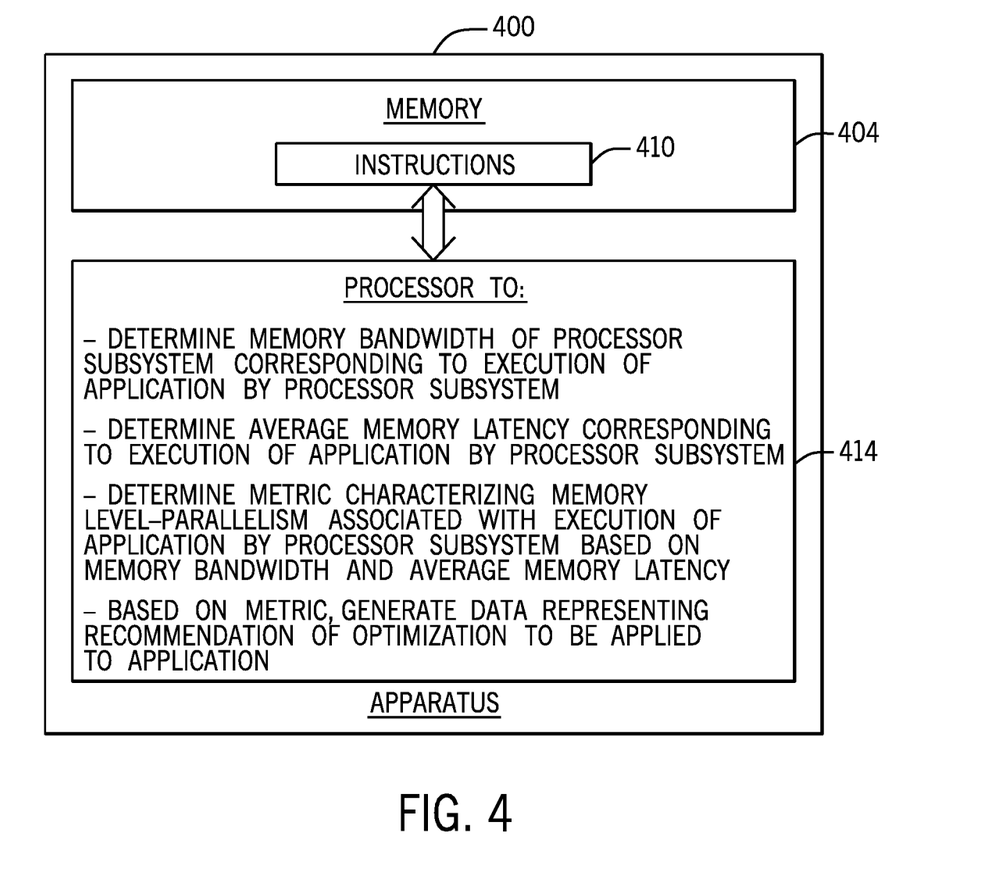
FIG. 4 is a block diagram of an apparatus to generate data representing a recommendation of an optimization to be applied to an application based on a metric that characterizes memory level-parallelism associated with the execution of the application according to an example implementation.

Referring to FIG. 4, in accordance with example implementations, an apparatus 400 includes a memory 404 and a processor 414. The memory stores instructions 410. The processor 414 is to determine a memory bandwidth of a processor subsystem corresponding to the execution of an application by the processor subsystem and determine an average memory latency corresponding to the execution of the application by the processor subsystem. The processor 414 is to determine a metric that characterizes memory level-parallelism associated with the execution of the application by the processor subsystem based on the memory bandwidth and the average memory latency. Based on the metric, the processor 414 generates data that represents a recommendation of an optimization to be applied to the application.

Figure 5:
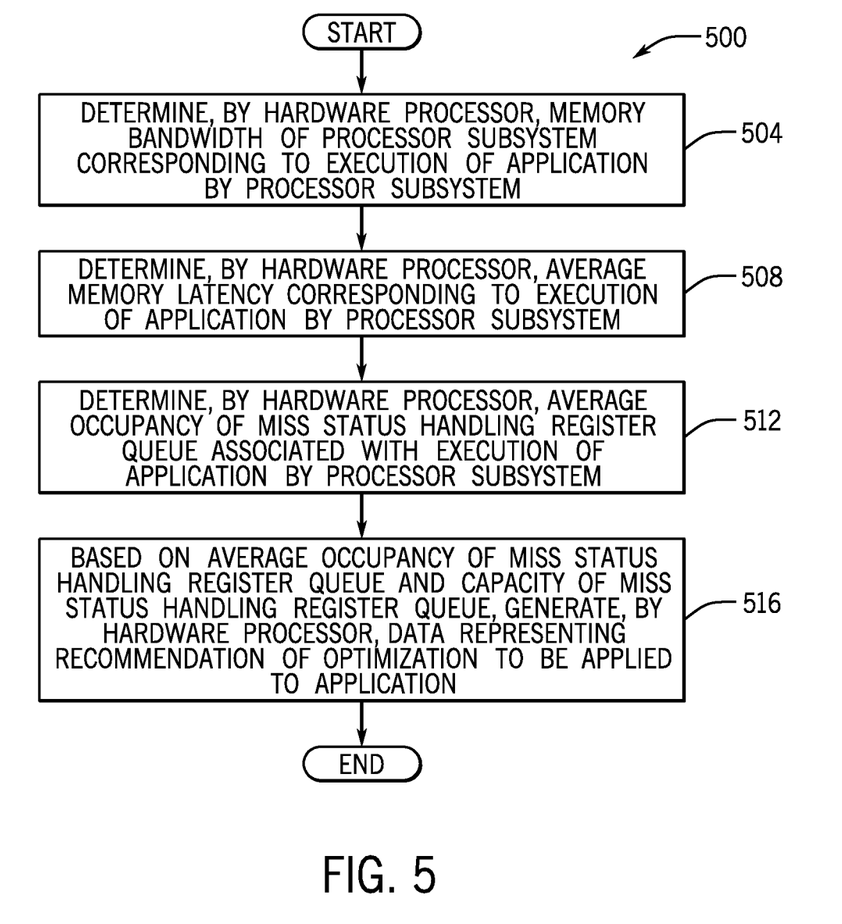
FIG. 5 is a flow diagram depicting a process to generate data representing a recommendation of an optimization to be applied to an application based on a determined average occupancy of a miss status handling register queue (MSHR) queue and a capacity of the MSHR queue according to an example implementation.

Referring to FIG. 5, in accordance with example implementations, a process 500 includes determining (block 504), by a hardware processor, a memory bandwidth of a processor subsystem corresponding to the execution of an application by the processor subsystem. Pursuant to block 508, the process 500 includes determining, by the hardware processor, an average memory latency corresponding to the execution of the application by the processor subsystem. Pursuant to block 512, the process 500 includes determining, by the hardware processor, an average occupancy of a miss status handling register queue associated with the execution of the application by the processor subsystem. Pursuant to block 516, the process 500 includes, based on the average occupancy of the miss status handling register queue and the capacity of the miss status handling register queue, generating, by the hardware processor, data that represents a recommendation of an optimization to be applied to the application.

Figure 6:
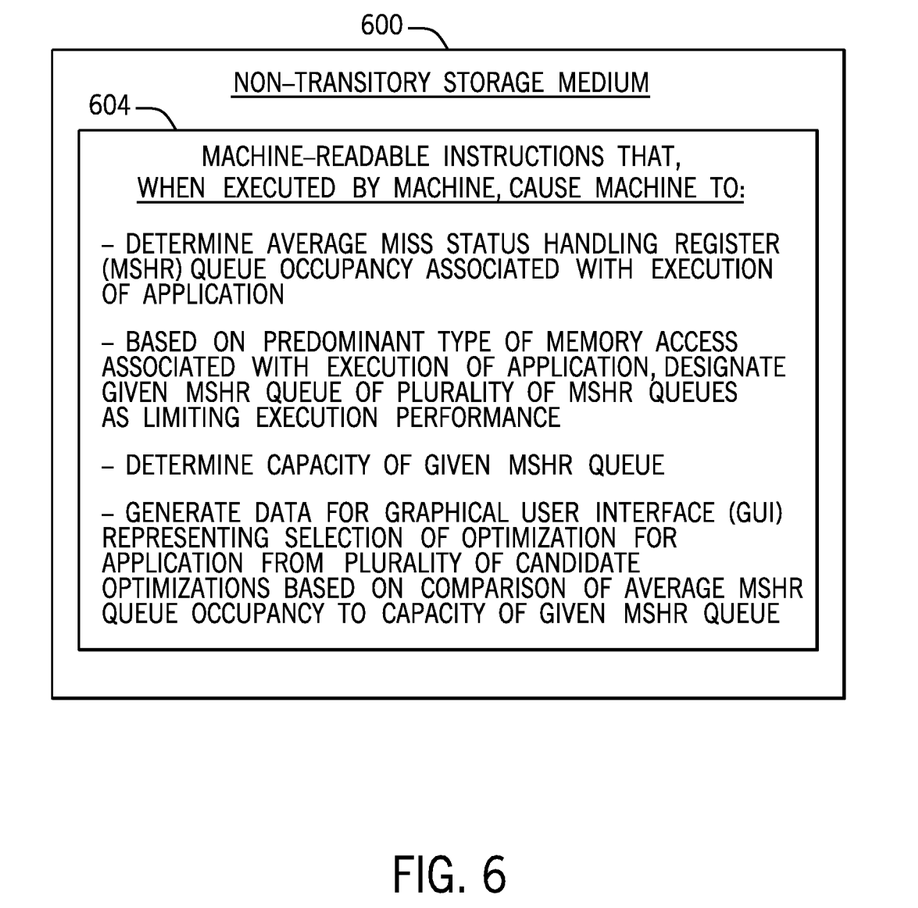
FIG. 6 is an illustration of machine-readable instructions that are stored on a non-transitory storage medium that, when executed by a machine, cause the machine to generate data for a graphical user interface (GUI) representing selection of an optimization for an application based on the comparison of an average occupancy of an MSHR queue to a capacity of the MSHR queue according to an example implementation.

Referring to FIG. 6, in accordance with example implementations, a non-transitory storage medium 600 stores machine-readable instructions 604 that, when executed by a machine, cause the machine to determine an average miss status handling register (MSHR) queue occupancy that is associated with the execution of an application; and based on the predominant type of memory access that is associated with the execution of the application, designate a given MSHR queue as limiting execution performance. The instructions 604, when executed by the machine, may cause the machine to determine a capacity of the given MSHR queue and generate data for a graphical user interface (GUI) representing the selection of an optimization for the application based on a comparison of the average MSHR queue occupancy to a capacity of the given MSHR queue.

In accordance with example implementations, the instructions, when executed by the hardware processor, further cause the hardware processor to process data provided by at least one performance counter of the processor subsystem to determine the memory bandwidth. Among the particular advantages, the metric may be determined using a relatively small number of performance counter values; the metric may be determined for a wide range of hardware processors corresponding a wide range of hardware processor vendors; and visualization of processor structures corresponding to performance bottlenecks may be simplified.

In accordance with example implementations, the instructions, when executed by the hardware processor, further cause the hardware processor to access data provided by a performance tool representing the memory bandwidth. Among the particular advantages, the metric may be determined using a relatively small number of performance counter values; the metric may be determined for a wide range of hardware processors corresponding a wide range of hardware processor vendors; and visualization of processor structures corresponding to performance bottlenecks may be simplified.

In accordance with example implementations, the instructions, when executed by the hardware processor, further cause the hardware processor to determine the average memory latency based on the memory bandwidth and a bandwidth versus latency relationship for the hardware processor. Among the particular advantages, the metric may be determined using a relatively small number of performance counter values; the metric may be determined for a wide range of hardware processors corresponding a wide range of hardware processor vendors; and visualization of processor structures corresponding to performance bottlenecks may be simplified.

In accordance with example implementations, the metric represents an average occupancy of a miss status handling register queue that is associated with a cache of the processor subsystem. Among the particular advantages, the metric may be determined using a relatively small number of performance counter values; the metric may be determined for a wide range of hardware processors corresponding a wide range of hardware processor vendors; and visualization of processor structures corresponding to performance bottlenecks may be simplified.

In accordance with example implementations, the processor subsystem includes a level one (L1) cache, a level two (L2) cache, a first miss status handling register (MSHR) queue associated with the L1 cache and a second miss status handling register (MSHR) queue associated with the L2 cache. The instructions, when executed by the hardware processor, further cause the hardware processor to associate the metric with one of the first MSHR queue or the second MSHR queue; use the metric as an indication of an occupancy of the associated MSHR queue; compare the occupancy to a capacity of the associated MSHR queue; and select the optimization responsive to a result of the comparison. Among the particular advantages, the metric may be determined using a relatively small number of performance counter values; the metric may be determined for a wide range of hardware processors corresponding a wide range of hardware processor vendors; and visualization of processor structures corresponding to performance bottlenecks may be simplified.

In accordance with example implementations, the instructions, when executed by the hardware processor, further cause the hardware processor to determine whether memory requests associated with the execution of the application are predominantly streaming accesses or predominantly random accesses; and select the optimization responsive to determining whether the memory requests are predominantly streaming accesses or predominantly random accesses. Among the particular advantages, the metric may be determined using a relatively small number of performance counter values; the metric may be determined for a wide range of hardware processors corresponding a wide range of hardware processor vendors; and visualization of processor structures corresponding to performance bottlenecks may be simplified.

In accordance with example implementations, the instructions, when executed by the hardware processor, further cause the hardware processor to determine that memory requests associated with the execution of the application are predominantly streaming accesses. The instructions, when executed by the hardware processor, further cause the hardware processor to, responsive to determining that the memory requests are predominantly streaming accesses, use the metric as an indication of an average occupancy of a miss status handling register (MSHR) queue that is associated with a level two (L2) cache of the processor subsystem; compare a capacity of the MSHR queue to the average occupancy; and select the optimization based on a result of the comparison. Among the particular advantages, the metric may be determined using a relatively small number of performance counter values; the metric may be determined for a wide range of hardware processors corresponding a wide range of hardware processor vendors; and visualization of processor structures corresponding to performance bottlenecks may be simplified.

In accordance with example implementations, the instructions, when executed by the hardware processor, further cause the hardware processor to compare the average occupancy to a threshold derived from the capacity, wherein the threshold comprises a boundary between the MSHR queue being considered to be almost full and the MSHR queue being considered to be less than full; and select the optimization responsive to the comparison of the average occupancy to the threshold. Among the particular advantages, the metric may be determined using a relatively small number of performance counter values; the metric may be determined for a wide range of hardware processors corresponding a wide range of hardware processor vendors; and visualization of processor structures corresponding to performance bottlenecks may be simplified.

In accordance with example implementations, the instructions, when executed by the hardware processor, further cause the hardware processor to generate the data for displaying the recommendation on a graphical user interface. Among the particular advantages, the metric may be determined using a relatively small number of performance counter values; the metric may be determined for a wide range of hardware processors corresponding a wide range of hardware processor vendors; and visualization of processor structures corresponding to performance bottlenecks may be simplified.

In accordance with example implementations, the instructions, when executed by the hardware processor, further cause the hardware processor to determine that memory requests associated with the execution of the application are predominantly random accesses. The instructions, when executed by the hardware processor, causes the hardware processor to, responsive to determining that the memory requests are predominantly random accesses, use the metric as an indication of a first average occupancy of a miss status handling register (MSHR) queue associated with a level one (L1) cache of the processor subsystem; compare a capacity of the MSHR queue to the first average occupancy; and select the optimization based on a result of the comparison. Among the particular advantages, the metric may be determined using a relatively small number of performance counter values; the metric may be determined for a wide range of hardware processors corresponding a wide range of hardware processor vendors; and visualization of processor structures corresponding to performance bottlenecks may be simplified.

In accordance with example implementations, the instructions, when executed by the hardware processor, further cause the hardware processor to compare the first average occupancy to a threshold derived from the capacity. The threshold defines a boundary between the MSHR queue being considered to be almost full and the MSHR queue being considered to be less than full. The instructions, when executed by the hardware processor, further cause the hardware processor to select the optimization responsive to the comparison of the first average occupancy to the threshold. Among the particular advantages, the metric may be determined using a relatively small number of performance counter values; the metric may be determined for a wide range of hardware processors corresponding a wide range of hardware processor vendors; and visualization of processor structures corresponding to performance bottlenecks may be simplified.

In accordance with example implementations, the instructions, when executed by the hardware processor, further cause the hardware processor to, responsive to the first average occupancy being greater than the capacity, use the metric as an indication of a second average occupancy of an MSHR queue that is associated with a level two (L2) cache of the processor subsystem; compare a capacity of the another MSHR queue to the second average occupancy; and select the optimization based on a result of the comparison of the capacity of the another MSHR queue to the second average occupancy. Among the particular advantages, the metric may be determined using a relatively small number of performance counter values; the metric may be determined for a wide range of hardware processors corresponding a wide range of hardware processor vendors; and visualization of processor structures corresponding to performance bottlenecks may be simplified.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. An apparatus comprising:
a hardware processor; and
a memory to store instructions that, when executed by the hardware processor cause the hardware processor to:
determine a memory bandwidth of a processor subsystem corresponding to an execution of an application by the processor subsystem;
determine an average memory latency corresponding to the execution of the application by the processor subsystem;
determine a metric characterizing a memory level-parallelism associated with the execution of the application by the processor subsystem based on the memory bandwidth and the average memory latency; and
based on the metric, generate data representing a recommendation of an optimization to be applied to the application.

2. The apparatus of claim 1, wherein the instructions, when executed by the hardware processor, further cause the hardware processor to process data provided by at least one performance counter of the processor subsystem to determine the memory bandwidth.

3. The apparatus of claim 1, wherein the instructions, when executed by the hardware processor, further cause the hardware processor to access data provided by a performance tool representing the memory bandwidth.

4. The apparatus of claim 1, wherein the instructions, when executed by the hardware processor, further cause the hardware processor to determine the average memory latency based on the memory bandwidth and a bandwidth versus latency relationship for the hardware processor.

5. The apparatus of claim 1, wherein the metric represents an average occupancy of a miss status handling register queue associated with a cache of the processor subsystem.

6. The apparatus of claim 1, wherein:
the processor subsystem comprises a level one (L1) cache, a level two (L2) cache, a first miss status handling register (MSHR) queue associated with the L1 cache and a second miss status handling register (MSHR) queue associated with the L2 cache; and
the instructions, when executed by the hardware processor, further cause the hardware processor to:
associate the metric with one of the first MSHR queue or the second MSHR queue;
use the metric as an indication of an occupancy of the associated one of the first MSHR queue or the second MSHR queue;
compare the occupancy to a capacity of the associated one of the first MSHR or the second MSHR; and
select the optimization responsive to a result of the comparison.

7. The apparatus of claim 1, wherein the instructions, when executed by the hardware processor, further cause the hardware processor to:
determine whether memory requests associated with the execution of the application are predominantly streaming accesses or predominantly random accesses; and
select the optimization responsive to determining whether the memory requests are predominantly streaming accesses or predominantly random accesses.

8. The apparatus of claim 1, wherein the instructions, when executed by the hardware processor, further cause the hardware processor to:
determine that memory requests associated with the execution of the application are predominantly streaming accesses; and
responsive to determining that the memory requests are predominantly streaming accesses:
use the metric as an indication of an average occupancy of a miss status handling register (MSHR) queue associated with a level two (L2) cache of the processor subsystem;
compare a capacity of the MSHR queue to the average occupancy; and
select the optimization based on a result of the comparison.

9. The apparatus of claim 8, wherein the instructions, when executed by the hardware processor, further cause the hardware processor to:
compare the average occupancy to a threshold derived from the capacity, wherein the threshold comprises a boundary between the MSHR queue being considered to be almost full and the MSHR queue being considered to be less than full; and
select the optimization responsive to the comparison of the average occupancy to the threshold.

10. The apparatus of claim 1, wherein the instructions, when executed by the hardware processor, further cause the hardware processor to generate the data for displaying the recommendation on a graphical user interface.

11. The apparatus of claim 1, wherein the instructions, when executed by the hardware processor, further cause the hardware processor to:
determine that memory requests associated with the execution of the application are predominantly random accesses; and
responsive to determining that the memory requests are predominantly random accesses:
use the metric as an indication of a first average occupancy of a miss status handling register (MSHR) queue associated with a level one (L1) cache of the processor subsystem;
compare a capacity of the MSHR queue to the first average occupancy; and
select the optimization based on a result of the comparison.

12. The apparatus of claim 11, wherein the instructions, when executed by the hardware processor, further cause the hardware processor to:
compare the first average occupancy to a threshold derived from the capacity, wherein the threshold defines a boundary between the MSHR queue being considered to be almost full and the MSHR being considered to be less than full; and
select the optimization responsive to the comparison of the first average occupancy to the threshold.

13. The apparatus of claim 11, wherein the instructions, when executed by the hardware processor, further cause the hardware processor to, responsive to the first average occupancy being greater than the capacity:

use the metric as an indication of a second average occupancy of an MSHR queue associated with a level two (L2) cache of the processor subsystem;

compare a capacity of the another MSHR to the second average occupancy; and select the optimization based on a result of the comparison of the capacity of the another MSHR queue to the second average occupancy.

14. A method comprising:

determining, by a hardware processor, a memory bandwidth of a processor subsystem corresponding to an execution of an application by the processor subsystem;

determining, by the hardware processor, an average memory latency corresponding to the execution of the application by the processor subsystem;

determining, by the hardware processor, an average occupancy of a miss status handling register queue associated with the execution of the application by the processor subsystem; and based on the average occupancy of the miss status handling register queue and a capacity of the miss status handling register queue, generating, by the hardware processor, data representing a recommendation of an optimization to be applied to the application.

15. The method of claim 14, wherein determining the memory bandwidth comprises determining a memory bandwidth corresponding to a subpart of the application.

16. The method of claim 15, wherein the subpart comprises a routine, subroutine or loop of the application.

17. A non-transitory storage medium to store machine-readable instructions that, when executed by a machine, cause the machine to:

determine an average miss status handling register (MSHR) queue occupancy associated with an execution of an application;

based on a predominant type of memory access associated with the execution of the application, designate a given MSHR queue of a plurality of MSHR queues as limiting execution performance;

determine capacity of the given MSHR queue; and generate data for a graphical user interface (GUI) representing selection of optimization for the application from a plurality of candidate optimizations based on a comparison of the average occupancy to a capacity of the given MSHR queue.

18. The storage medium of claim 17, wherein the instructions, when executed by the machine, further cause the machine to:

designate the given MSHR queue responsive to the given MSHR queue being associated with a level one (L1) cache and the predominant type of memory access associated with the application being a random access.

19. The storage medium of claim 17, wherein the instructions, when executed by the machine, further cause the machine to:

designate the given MSHR queue responsive to the given MSHR queue being associated with a level two (L2) cache and the predominant type of memory access associated with the application being a streaming access.

20. The storage medium of claim 17, wherein the instructions, when executed by the machine, further cause the machine to:

determine the average miss status handling register (MSHR) queue occupancy based on an average memory latency associated with the execution of the application, a bandwidth associated with the execution of the application, and a cache line size.

* * * * *